United States Patent

Achari et al.

[11] Patent Number: 5,871,690
[45] Date of Patent: Feb. 16, 1999

[54] LOW-TEMPERATURE SOLDER COMPOSITIONS

[75] Inventors: Achyuta Achari; Mohan R. Paruchuri, both of Canton; Dongkai Shangguan, Novi, all of Mich.

[73] Assignee: Ford Motor Company, Dearborn, Mich.

[21] Appl. No.: 939,644

[22] Filed: Sep. 29, 1997

[51] Int. Cl.[6] .................................................... C22C 13/02
[52] U.S. Cl. ........................................... 420/559; 420/589
[58] Field of Search ..................................... 420/557, 559, 420/589

[56] References Cited

U.S. PATENT DOCUMENTS

| | | | |
|---|---|---|---|
| 4,834,794 | 5/1989 | Yagi et al. | 75/255 |
| 5,573,602 | 11/1996 | Banerji et al. | 148/24 |

FOREIGN PATENT DOCUMENTS

| | | |
|---|---|---|
| 363740 | 4/1990 | European Pat. Off. . |
| 652072 | 5/1995 | European Pat. Off. . |
| 55024720 | 2/1980 | Japan . |
| 60203394 | 10/1985 | Japan . |
| 03128192 | 5/1991 | Japan . |
| 032041494 | 9/1991 | Japan . |
| 06269984 | 9/1994 | Japan . |
| 1500455 | 8/1989 | U.S.S.R. . |

*Primary Examiner*—Sikyin Ip
*Attorney, Agent, or Firm*—Lorraine S. Melotik

[57] ABSTRACT

Low temperature electrical solder compositions (by weight percent) having between 45–60% Sn; 25–40% Pb; 5–15% Bi; and 0.5–2.5% In. Preferably, the solder compositions have a melting temperature of about 154°–162° C. The solder compositions have microstructure similarly to Sn/Pb eutectic microstructure which makes them have excellent properties like higher yield strength and better creep resistance providing long term reliability to solder joints.

6 Claims, No Drawings

5,871,690

LOW-TEMPERATURE SOLDER COMPOSITIONS

TECHNICAL FIELD

The present invention relates to an electrical solder composition comprising tin (Sn), lead (Pb), bismuth (Bi), and indium (In). More specifically, the present invention relates to an electrical solder composition having between 45–60% Sn; 25–40% Pb; 5–15% Bi, and 0.5–2.5% In. Preferably the solder has a melting point of about 154°–162° C. All percentages are by weight.

BACKGROUND OF THE INVENTION

In electronics manufacturing, solders provide inexpensive, mass-producible and generally reliable interconnections to complete the electronic circuitry between various elements that make up an electronic assembly. Solder joints provide electrical interconnections and serve as the mechanical attachment of the electronic components to the printed circuit board and also serve a critical heat transfer function as well. Soldering make these connections at temperatures just below those that would cause damage to some of the elements of the assembly and substrate materials.

Reflow soldering is the predominant soldering method for Surface Mount Technology (SMT) assemblies. This technique provides an opportunity to handle a wider range of electronic assemblies than were possible with wave soldering. Eutectic solder, 63% Sn/37% Pb solder (melting temperature being 183° C.) is commonly used for reflow soldering with peak reflow temperature of 210°–220° C. In order to use low cost thermoplastic substrate materials and some temperature-sensitive components for integration of many of such components in a small area as perhaps attached to an automotive dashboard, it is required to reflow at lower peak temperatures than 220° C.

It is known that eutectic 63 Sn/37 Pb solder joints are reliable during thermal cycling between –40° C. and 125° C. Since maximum temperature for thermal cycling in integration applications is 105° C. instead of 125° C., a low temperature solder based on tin-lead eutectic and having a melting temperature 20° C. lower than that of 63 Sn/37 Pb is likely to survive thermal cycling between –40° C. and 105° C. Low temperature solder compositions such as 43 Sn/43 Pb/14 Bi or 52 Sn/48 Bi (U.S. Pat. No. 5,573,602) can be reflowed at a peak temperature of 180° C. But these solder compositions have wide pasty ranges (up to 20° C.) between solidus and liquidus temperatures which can lead to damage of the solder joints during reflow soldering/cooling process. Also, such solders which might include a significant amount of indium to reduce the melting point greatly increase the cost of the solder.

It would be desirable to provide new low temperature solders with a melting temperature of less than 165° C. and with a narrow pasty range, preferably being about 5° C., which can provide long term reliability of solder joints and which is priced to be commercially useful for large volume applications. The present invention provides such solder compositions.

SUMMARY OF THE INVENTION

The present invention is related to an electrical solder composition having between 45–60% Sn; 25–40% Pb; 5–15% Bi; and 0.5–2.5% In. Preferably the solders have melting temperature of about 154°–162° C. All percentages are by weight. These solders have been found to have microstructures very similar to Sn/Pb eutectic microstructure with some primary Pb-phase dendrites and Bi dissolution in Pb-phase and In dissolution in Sn-phase. Near eutectic microstructure of these solders also causes higher yield strength and better creep resistance, and thus provides long term reliability to the solder joints.

Advantageously, because of the low amount of indium incorporated in the present invention solders, these invention solders are considerably less costly than currently available low temperature solders. Hence these solders advantageously is affordable for large volume use as necessary in automotive applications.

It is also a desired feature of the present invention to provide a solder exhibiting favorable thermal and electrical conductivity and satisfactory mechanical properties. These and other advantages, features and objects of the present invention will become more apparent to those of ordinary skill in the art upon reference to the following description.

DETAILED DESCRIPTION OF THE PREFERRED EMBODIMENTS

The invention solder compositions include the components: 45–60 % tin, 25–40% lead, 5–15% bismuth and 0.5–2.5% indium. Two particularly preferred embodiments of such compositions have the proportions 51 Sn/39 Pb/8.5 Bi/1.5 In and 50 Sn/37 Pb/10.5 Bi/2.5 In, respectively, of such components.

The present invention is directed to a low-temperature solder that has a narrow pasty range. Having a narrow pasty range allow for fast set up of the solder so that components can be made rapidly without damage to the solder joints. Preferably, the pasty range is about 5° C. The invention solder also has good fatigue and creep resistance.

The solder is especially useful to provide a durable and damage resistant electrical interconnect for electronic components exposed to wide temperature variations as is commonly found in automotive applications. A common automotive test for measuring the durability of a solder is to expose the interconnect to a large temperature variation, typically from –40° to 105° C. in applications where components are mounted to thermoplastic substrates in the integration systems mentioned above. As disclosed above, an object of the invention is to provide solders useful in electronic circuit integration systems in automotive vehicles. In this accelerated test, temperature variation is repeated more than one thousand times. Each cycle from hot to cold causes the substrate, electronic component, metal leads and the solder to expand and contract (often with widely different coefficients of thermal expansion).

The repeated cycle of hot and cold may cause fatigue in the solder interconnect and weaken the attachment. If the weakening is extensive, the interconnect can fail by solder cracking and the component becomes inoperable. While not wishing to be bound by the following theory, it is believed that the thermal cycling causes the microstructure of the solder to coarsen. The coarser grain structure can lead to reduced fatigue strength and makes the solder more susceptible for crack formation and propagation under thermomechanical loading. The invention solder overcomes this problem it is believed by reducing the rate of grain growth/coarsening with bismuth and indium additions in small quantities. However, neither the accuracy nor understanding of this theory is necessary for practice of the present invention.

Fabrication of Sample Compositions

Solder samples were fabricated using well-established methods. High purity metals were used as starting materials.

These included 99.99+% Sn and Pb shots, 99.99+% Bi and In wire bits. These ingredients were mixed in predetermined proportions. Alumina crucibles were used. The ingredients were melted in a tube furnace, under a flowing $N_2$ atmosphere to prevent oxidation. The alloy was kept in a molten state for up to 20 minutes and stirred for homogenization. Furnace temperature was measured with thermocouples and recorded with a chart recorder.

The following samples were made by mixing respective starting metals in the proportions shown below.

TABLE 1

| | Solder Alloys (weight percentages) | | | | | |
|---|---|---|---|---|---|---|
| Alloy Sample No. | Sn | Pb | Bi | In | Micro Hardness (KHN) | Melting Temp (°C.) |
| 1 | 51 | 39 | 8.5 | 1.5 | 15.4 | 157/162 |
| 2 | 50 | 37 | 10.5 | 2.5 | 16.4 | 154/159 |

Samples were taken from each alloy ingot and submitted for chemical analysis. Results indicate that the final alloy composition is close to the starting composition.

Differential Scanning Calorimetric (DSC) Analysis

Samples were taken for each alloy ingot for DSC analysis. The melting temperatures of the alloys in Table 1 were determined by differential scanning calorimetric (DSC) analysis. The analysis was performed using a DuPont DSC 2910 system under a flowing $N_2$ atmosphere at a given heating/cooling rate (5° C./minute). The characteristic temperatures from the DSC curves were analyzed to determine the melting temperatures of the alloys, which are summarized in Table 1 above.

Microstructural Analysis

Microstructural analysis was performed using chemical etching, optical microscopy, scanning electron microscope (SEM) microprobe, and x-ray diffraction (XRD). Suitable etchants for the disclosed alloys include a solution of diluted hydrochloric acid.

The microhardness of these alloys have been measured on a microhardness tester. Thirty measurements were taken for each sample using a 25 g load for 0.5 seconds and the average was taken for each sample. The results of the hardness (expressed as a Knoop hardness number or KHN) are summarized in Table 1 above.

The alloys exhibit a eutectic microstructure consisting of the Pb-phase dendrites and Bi dissolution in Pb-phase and In dissolution in Sn-phase. During thermal cycling the grain growth of these phases is very limited. Thermal cycling is a process of aging the soldered component between temperature extremes (typically −40° to 105° C.). The dissolution of bismuth and indium in these phases make the solder more resistant to crack formation and propagation in the interconnect. This long term fine-grain microstructure is believed to be key to durability by increasing the creep resistance and the fatigue strength because the fine grain structure resists crack propagation and reduces the likelihood of fracture. Concentrations higher than 15% Bi or 2.5% In are undesirable because they will reduce the benefits of eutectic microstructures and will cause formation of coarse grain structure. Thus, another feature of the present solders is their stability after thermal aging. This long term thermal stability is essential for solder interconnects used in automotive applications.

Application

The alloys made according to the present invention were found to be readily manufacturable and utilized existing commercial equipment for manufacturing and usage. Because of the relatively low indium content, the alloys were low cost and suitable for production in large commercial quantities.

The solders made from these compositions may be used in either a paste form (as in reflow soldering) or alternatively in bar solder form (as in wave soldering). Regular soldering processes (reflow, wave soldering and others) may be used with these solder compositions. In each case, the soldering peak temperature will generally be at least 10°–15° C. or preferably 15°–30° C. above the melting temperature of the solder alloy. These solder alloys are also compatible with conventional flux systems such as no-clean flux.

The most preferred alloy embodiment are shown in Table 1. The various embodiments of the invention alloys, especially the preferred embodiments, may be adapted for further improvement of mechanical and physical properties by the inclusion of small quantities (less than 1% by weight) of other elements such as Sb, Co, Si, Mg, Ca, Se, Cs, Ce, Te, Au, Ni, Cu and Zn. The addition of up to 2.5% Au improves ductility and strength of the alloy.

While the best mode for carrying out the present invention has been described in detail, those familiar with the art to which the invention relates will recognize various alternative designs and embodiments for practicing the invention as defined by the following claims.

What is claimed:

1. An electrical solder composition consisting of:
   between 45–60% Sn;
   25–40% Pb;
   5–15% Bi; and
   0.5–2.5% In; and
   0.1–1 wt. % of metal selected from the group consisting of: Sb, Co, Si, Mg, Ca, Ce, Te, Au, Ni, Cu, Zn, Se, Cs, and a mixture of any of them;
   said solder having a melting temperature of about 154°–162° C.

2. The electrical solder composition of claim 1, wherein said composition is about:
   51% Sn;
   39% Pb;
   8.5% Bi; and
   1.5 In.

3. The electrical solder composition of claim 1, wherein said composition is about:
   50% Sn;
   37% Pb;
   10.5% Bi; and
   2.5 In.

4. The electrical solder composition of claim 1 wherein said composition has a microstructure with primary Pb-phase dendrites and Bi dissolution in the Pb-phase and In dissolution in the Sn-phase.

5. A solder joint comprising the solder composition of claim 1 adhered between electronic elements located on a thermoplastic material.

6. The electrical solder composition of claim 1, when the solder has a pasty range of 5° C.

* * * * *